(12) United States Patent
Hellemann

(10) Patent No.: US 11,199,115 B2
(45) Date of Patent: Dec. 14, 2021

(54) OIL SYSTEM AND METHOD OF CONTROLLING OIL SYSTEM

(71) Applicant: VOLVO TRUCK CORPORATION, Gothenburg (SE)

(72) Inventor: Fabian Hellemann, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/271,458

(22) PCT Filed: Aug. 30, 2018

(86) PCT No.: PCT/EP2018/073311
§ 371 (c)(1),
(2) Date: Feb. 25, 2021

(87) PCT Pub. No.: WO2020/043290
PCT Pub. Date: Mar. 5, 2020

(65) Prior Publication Data
US 2021/0310384 A1    Oct. 7, 2021

(51) Int. Cl.
*F01P 1/06* (2006.01)
*F01M 1/02* (2006.01)
(Continued)

(52) U.S. Cl.
CPC .............. *F01M 1/02* (2013.01); *F01M 5/002* (2013.01); *F01M 11/0004* (2013.01); *F01M 11/02* (2013.01); *F01M 2250/60* (2013.01)

(58) Field of Classification Search
CPC .. F16D 48/02; F16H 61/0025; F16H 61/0031; F16H 2061/0037; F16H 57/0435
(Continued)

(56) References Cited

U.S. PATENT DOCUMENTS

2012/0048228 A1   3/2012   Chung
2013/0310216 A1*  11/2013  Kamiya .................. B60L 50/16
                                                            477/5
(Continued)

FOREIGN PATENT DOCUMENTS

DE   102015111860 A1   1/2017
JP   2017150358 A      8/2017
KR   20040041971 A     5/2004

OTHER PUBLICATIONS

International Search Report and Written Opinion dated May 20, 2019 in corresponding International PCT Application No. PCT/EP2018/073311, 14 pages.

*Primary Examiner* — Long T Tran
*Assistant Examiner* — James J Kim
(74) *Attorney, Agent, or Firm* — Venable LLP; Jeffri A. Kaminski

(57) ABSTRACT

The invention relates to an oil system (7) comprising a pump arrangement (11); a first gallery (13) for providing oil to a first engine site (14); a second gallery (15) for providing oil to a second engine site (16); a second gallery flow control device (25) for controlling flow of oil from the pump arrangement (11) to the second gallery (15); control circuitry (5); a first pressure sensor (27) for sensing the oil pressure in the first gallery (13); and a second pressure sensor (29) for sensing the oil pressure in the second gallery (15). The oil system (7) is controllable between: a first state in which the control circuitry (5) controls the second gallery flow control device (25) to an open state, and controls an oil pressure in the second gallery (15) by controlling the pump arrangement (11); and a second state in which the control circuitry (5) controls an oil pressure in the first gallery (13) by controlling the pump arrangement (11), and controls the oil pressure in the second gallery (15) by controlling the second gallery flow control device (25).

13 Claims, 3 Drawing Sheets

(51) Int. Cl.
*F01M 11/00* (2006.01)
*F01M 5/00* (2006.01)
*F01M 11/02* (2006.01)

(58) Field of Classification Search
USPC .................................................. 123/41.31
See application file for complete search history.

(56) References Cited

U.S. PATENT DOCUMENTS

| | | | |
|---|---|---|---|
| 2013/0332036 A1* | 12/2013 | Yamamoto | E02F 9/2228 |
| | | | 701/50 |
| 2015/0300218 A1* | 10/2015 | Taguchi | F01M 1/08 |
| | | | 123/196 CP |
| 2016/0222843 A1* | 8/2016 | Koguchi | F01M 1/08 |
| 2017/0198654 A1* | 7/2017 | Yu | F01P 11/16 |
| 2017/0241307 A9 | 8/2017 | Borek et al. | |
| 2017/0342891 A1 | 11/2017 | Ha | |
| 2018/0030867 A1* | 2/2018 | Honda | F01M 1/02 |
| 2018/0058277 A1 | 3/2018 | Demots | |
| 2018/0163585 A1 | 6/2018 | Lee | |

\* cited by examiner

OIL SYSTEM AND METHOD OF CONTROLLING OIL SYSTEM

CROSS-REFERENCE TO RELATED APPLICATIONS

This application is a U.S. National Stage application of PCT/EP2018/073311, filed Aug. 30, 2018, and published on Mar. 5, 2020, as WO 2020/043290 A1, all of which is hereby incorporated by reference in its entirety.

TECHNICAL FIELD

The invention relates to an oil system, to a method of controlling an oil system, and to an internal combustion engine arrangement.

The invention can be applied in heavy-duty vehicles, such as trucks, buses and construction equipment. Although the invention will be described with respect to a truck, the invention is not restricted to this particular vehicle, but may also be used in other vehicles such as a bus, or working machines, such as wheel loaders or excavators etc.

BACKGROUND

An internal combustion engine (ICE) has an oil system for lubricating and/or cooling different parts of the ICE. The oil system generally has an oil pump for pumping oil from a sump to different so-called galleries. From each gallery, different parts of the ICE are supplied with oil. A diesel engine may, for example, have a main gallery for supply of oil to the crank shaft bearings etc., and a piston cooling jet (PCJ) gallery for supply of oil to nozzles spraying the bottom side of the pistons.

The oil pressure needed in each gallery depends on the operating point of the ICE, with respect to various parameters, such as engine speed, engine load and/or oil temperature. Dimensioning the oil system for maximum possible pressure requirement, may often result in unnecessarily high oil pump work.

US 2012/0048228 discloses an oil system in which a solenoid valve disposed in a channel connecting an inlet and an outlet of an oil pump supplying oil from an oil pan to the engine, is controlled on the basis of number of revolution of the engine, load of the engine, and temperature of the oil.

It would, however, be desirable to provide an improved oil system, in particular providing for more energy efficient operation.

SUMMARY

An object of the invention is thus to provide an improved oil system, in particular providing for more energy efficient operation.

According to a first aspect of the present invention, this object is achieved by a method of controlling an oil system for an internal combustion engine, the oil system comprising an oil reservoir; a controllable pump arrangement fluid flow connected to the oil reservoir for pumping oil from the oil reservoir; a first gallery fluid flow connected to the pump arrangement for receiving oil from the pump arrangement, the first gallery being configured to provide oil to a first engine site; a second gallery fluid flow connected to the pump arrangement for receiving oil from the pump arrangement, the second gallery being configured to provide oil to a second engine site; a second gallery flow control device for controlling flow of oil from the pump arrangement to the second gallery; a first pressure sensor for sensing an oil pressure in the first gallery; and a second pressure sensor for sensing an oil pressure in the second gallery. The method comprises the steps of: estimating a minimum required first gallery oil pressure in the first gallery for sufficient oil supply to the first engine site; estimating a minimum required second gallery oil pressure in the second gallery for sufficient oil supply to the second engine site; when a ratio between the minimum required second gallery oil pressure and the minimum required first gallery oil pressure is greater than a predefined first threshold ratio: controlling the second gallery flow control device to an open state; acquiring a signal indicative of a present oil pressure in the second gallery from the second pressure sensor; controlling the pump arrangement to achieve at least the minimum required second gallery oil pressure in the second gallery using feedback control based on the signal indicative of the present oil pressure in the second gallery; and when the ratio between the minimum required second gallery oil pressure and the minimum required first gallery oil pressure is smaller than a predefined second threshold ratio: acquiring a signal indicative of the present oil pressure in the first gallery from the first pressure sensor; and controlling the pump arrangement to achieve at least the minimum required first gallery oil pressure in the first gallery using feedback control based on the signal indicative of the present oil pressure in the first gallery; acquiring the signal indicative of the present oil pressure in the second gallery from the second pressure sensor; and controlling the second gallery flow control device to achieve at least the minimum required second gallery oil pressure in the second gallery using feedback control based on the signal indicative of the present oil pressure in the second gallery.

It should be noted that the second gallery flow control device may advantageously be controlled to a fully open state or to a nearly fully open state, when the ratio between the minimum required second gallery oil pressure and the minimum required first gallery oil pressure is greater than the predefined first threshold ratio.

It should also be noted that, according to embodiments of the present invention, the different operational modes or states of the oil system may be selected in view of a single threshold, or in view of different thresholds depending on the present state of the oil system. In other words, the first threshold ratio and the second threshold ratio may be constituted by a single threshold ratio, or the first and second threshold ratios may be different. Advantageously, for stable control of the oil system with hysteresis, the second threshold ratio may be smaller than the first threshold ratio.

The present invention is based on the realization that more precise control of the oil pressures in different parts of the oil system can be achieved by feedback control based on sensed oil pressures in the first and second galleries, and selecting different feedback control strategies depending on the oil pressure requirements in the different parts of the oil system. This more precise control of the oil pressures in turn provides for more energy-efficient operation of the oil system, and thus of the ICE arrangement comprising the oil system.

According to various embodiments, the feedback control of the controllable pump arrangement may be configured to exhibit a first time constant; the feedback control of the second gallery flow control device may be configured to exhibit a second time constant; and the second time constant may be less than the first time constant. By making the control of the second gallery flow control device faster than the control of the pump arrangement, it can be ensured that the two controllers do not work against each other, so that stable control of the oil system can be achieved.

According to embodiments, the minimum required first gallery oil pressure and the minimum required second gallery oil pressure may be estimated based on at least one of an engine speed, an engine load, and an oil temperature.

According to embodiments, the second gallery may be a piston cooling jet gallery; and the second engine site may comprise at least one piston of the engine.

According to a second aspect of the present invention, this object is achieved by an oil system for an internal combustion engine, comprising: a controllable pump arrangement fluid flow connected to an oil reservoir for pumping oil from the oil reservoir; a first gallery fluid flow connected to the pump arrangement for receiving oil from the pump arrangement, the first gallery being configured to provide oil to a first engine site; a second gallery fluid flow connected to the pump arrangement for receiving oil from the pump arrangement, the second gallery being configured to provide oil to a second engine site; a second gallery flow control device for controlling flow of oil from the pump arrangement to the second gallery; control circuitry having at least one input for receiving at least one signal indicative of at least one of an engine speed, an engine load, and an oil temperature, a first output connected to the pump arrangement, and a second output connected to the second gallery flow control device; a first pressure sensor for sensing the oil pressure in the first gallery; and a second pressure sensor for sensing the oil pressure in the second gallery, wherein the oil system is controllable between: a first state in which the control circuitry controls the second gallery flow control device to an open state, acquires a signal indicative of a present oil pressure in the second gallery from the second pressure sensor, and controls an oil pressure in the second gallery by controlling the pump arrangement using feedback control based on the signal indicative of the present oil pressure in the second gallery; and a second state in which the control circuitry acquires a signal indicative of the present oil pressure in the first gallery from the first pressure sensor, controls an oil pressure in the first gallery by controlling the pump arrangement using feedback control based on the signal indicative of the present oil pressure in the first gallery, and controls the oil pressure in the second gallery by controlling the second gallery flow control device using feedback control based on the signal indicative of the present oil pressure in the second gallery.

The controllable pump arrangement may be realized in various ways known to one of ordinary skill in the art, for instance, by means of a variable vane pump, or by a pump with a controllable bypass valve, etc.

According to various embodiments, the control circuitry may be configured to: estimate a minimum required first gallery oil pressure in the first gallery for sufficient oil supply to the first engine site; estimate a minimum required second gallery oil pressure in the second gallery for sufficient oil supply to the second engine site; control the oil system to transition from the second state to the first state when a ratio between the minimum required second gallery oil pressure and the minimum required first gallery oil pressure has increased to become greater than a predefined first threshold ratio; and control the oil system to transition from the first state to the second state when the ratio between the minimum required second gallery oil pressure and the minimum required first gallery oil pressure has decreased to become smaller than a predefined second threshold ratio.

According to embodiments, the second threshold ratio may be smaller than the first threshold ratio.

Furthermore, the oil system according to embodiments of the present invention may advantageously be included in an internal combustion engine arrangement.

The internal combustion engine arrangement may be included in a vehicle.

A further aspect of the invention relates to a control unit for controlling the oil system according to embodiments of the present invention, the control unit being configured to perform the steps of the method according to embodiments of the present invention.

A further aspect of the invention relates to a computer program configured to cause the oil system according to embodiments of the present invention to carry out the method according to embodiments of the present invention when run on the control circuitry comprised in the oil system according to embodiments of the present invention.

A further aspect of the present invention relates to a computer readable medium carrying a computer program comprising program code means for controlling the steps of the method according to embodiments of the present invention when said program product is run on a computer.

In summary, aspects of the present invention thus relate to an oil system comprising a pump arrangement; a first gallery for providing oil to a first engine site; a second gallery for providing oil to a second engine site; a second gallery flow control device for controlling flow of oil from the pump arrangement to the second gallery; control circuitry; a first pressure sensor for sensing the oil pressure in the first gallery; and a second pressure sensor for sensing the oil pressure in the second gallery. The oil system is controllable between: a first state in which the control circuitry controls the second gallery flow control device to an open state, and controls an oil pressure in the second gallery by controlling the pump arrangement; and a second state in which the control circuitry controls an oil pressure in the first gallery by controlling the pump arrangement, and controls the oil pressure in the second gallery by controlling the second gallery flow control device.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
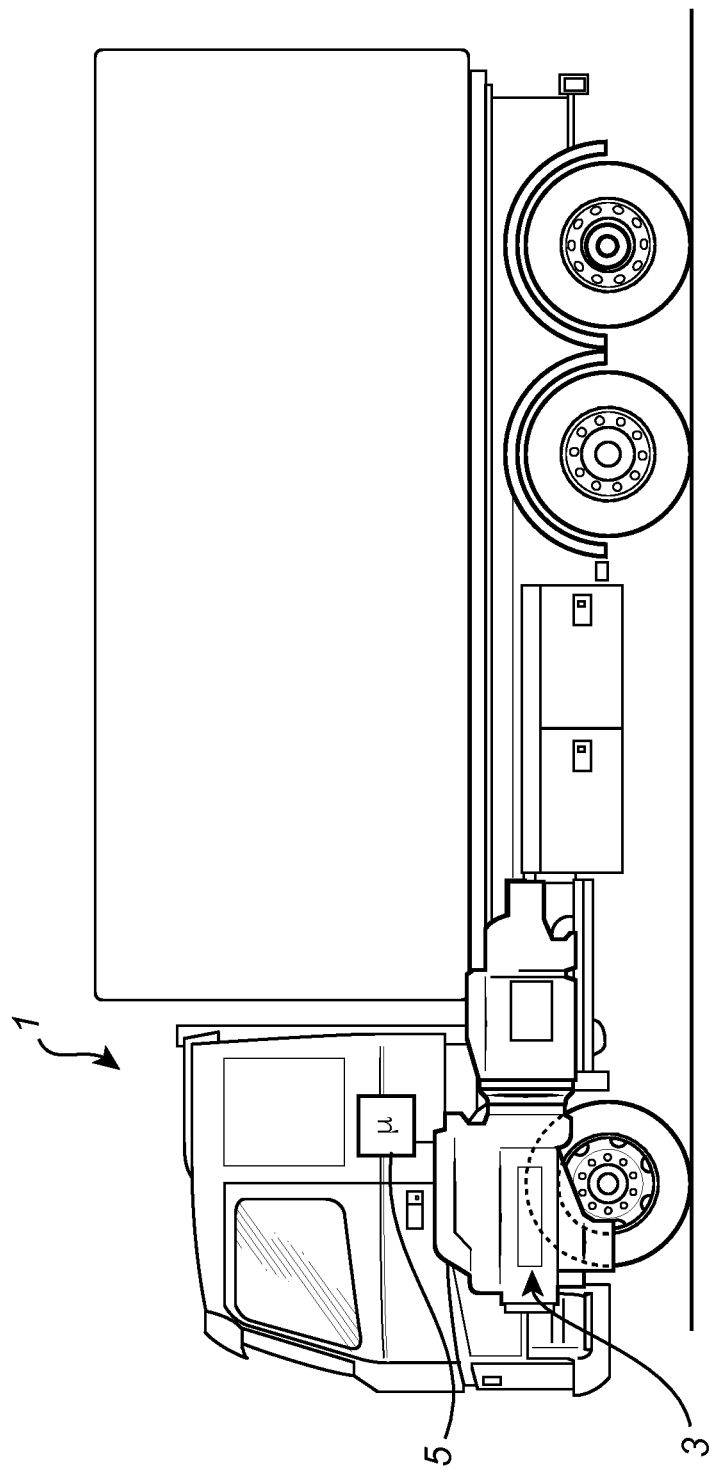
FIG. 1 is a side view of a vehicle according to an embodiment of the present invention, in the form of a truck including an ICE arrangement.

FIG. 1 schematically shows a vehicle, here in the form of a truck 1, including an ICE arrangement 3 according to an example embodiment of the present invention. The ICE arrangement 3 comprises a control unit 5 for controlling operation of the ICE arrangement 3. The ICE arrangement 3 comprises an oil system 7 (not visible in FIG. 1) for lubrication and cooling of the ICE arrangement 3.

Figure 2:
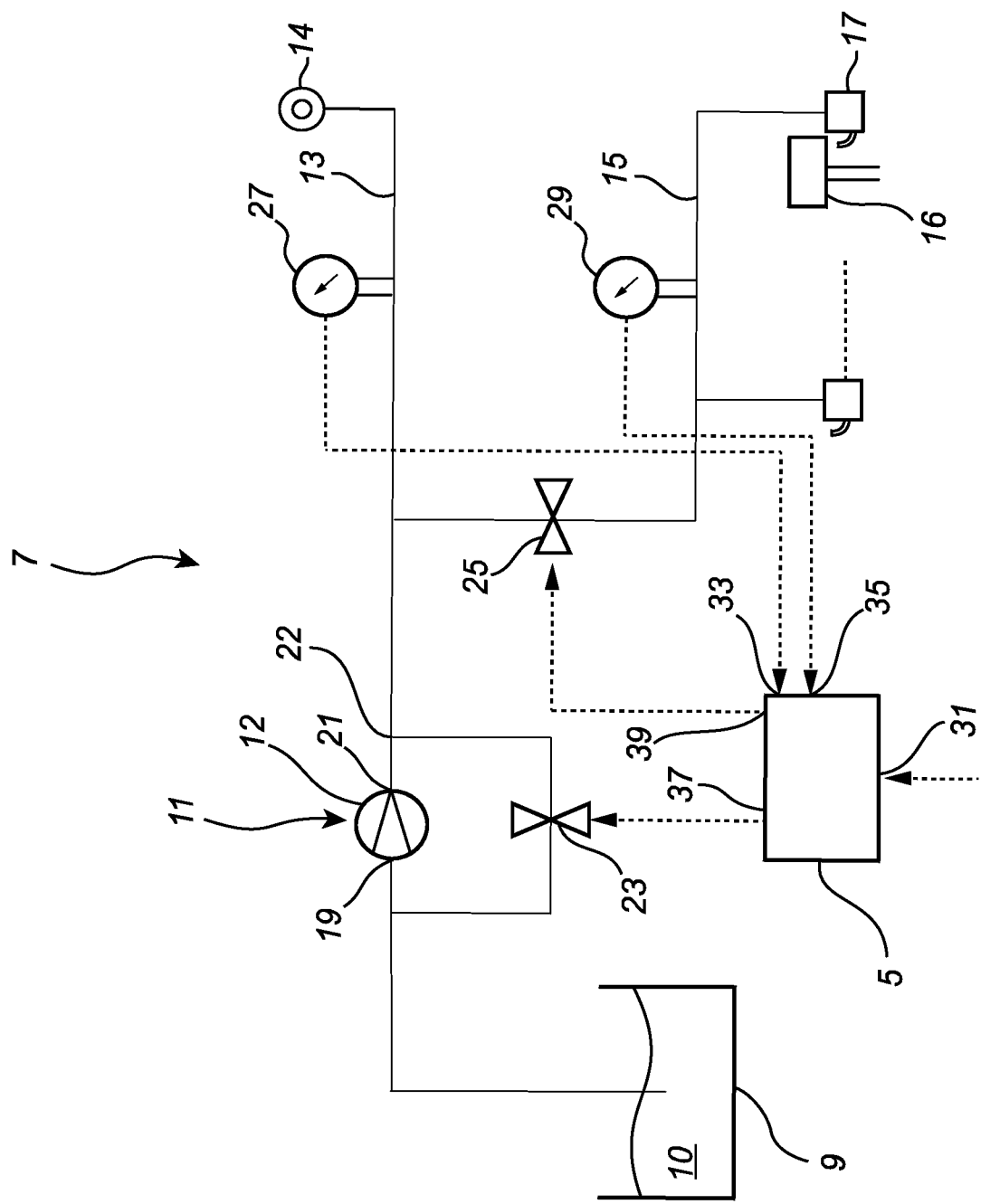
FIG. 2 is a simplified schematic illustration of an oil system according to an example embodiment of the present invention.

FIG. 2 is a simplified schematic illustration of an oil system according to an example embodiment of the present invention. For instance, various parts not central to the present invention have been omitted. Such parts may include, for example, an oil filter, and an oil heater, etc. Such and other oil system parts are, however, well known to one of ordinary skill in the art.

Referring to FIG. 2, the oil system 7 comprises an oil reservoir 9 containing oil 10, a controllable pump arrangement 11 fluid flow connected to the oil reservoir 9, a first gallery 13 and a second gallery 15 fluid flow connected to the pump arrangement 11, a first pressure sensor 27, a second pressure sensor 29, a second gallery flow control device 25, and a control unit 5.

The first gallery 13, which may for example be the so-called main gallery of a diesel engine, is configured to provide oil to a first engine site 14, here schematically represented by a crank shaft bearing. The second gallery 15, which may for example be the so-called piston cooling jet (PCJ) gallery of a diesel engine, is configured to provide oil to a second engine site 16. In FIG. 2, the second engine site is schematically represented by a piston, and the oil system 7 is shown to comprise nozzles 17 for spraying the bottom of the pistons.

The first pressure sensor 27 is arranged to sense the oil pressure in the first gallery 13, and to provide a signal indicative of the oil pressure in the first gallery 13 to the control unit 5. The second pressure sensor 29 is arranged to sense the oil pressure in the second gallery 15, and to provide a signal indicative of the oil pressure in the second gallery 15 to the control unit 5. The second gallery flow control device 25 is here provided as a valve arranged on a flow path between the pump arrangement 11 and the second gallery 15. The second gallery valve 25 is controllable by a signal from the control unit 5, as is schematically indicated in FIG. 2.

The controllable pump arrangement 11 is here exemplified as a conventional oil pump 12 which may be driven by the rotation of the crank shaft of the ICE 3, and a controllable bypass valve 23 connected between the inlet 19 and the outlet 21 of the oil pump 12. By controlling the opening of the bypass valve 23, the oil pressure at the outlet 22 of the pump arrangement 11 can be controlled.

The control unit 5 comprises a first input 31 for receiving ICE parameters, such as engine speed, engine load, and/or oil temperature, a second input 33 for receiving a signal from the first pressure sensor 27, a third input 35 for receiving a signal from the second pressure sensor 29, a first output 37 for controlling the bypass valve 23 comprised in the pump arrangement 11, and a second output 39 for controlling the second gallery valve 25.

Based on the engine parameters received at the first input 31, the control unit 5 can estimate minimum required oil pressures in the different galleries, and control the oil system 7 between at least a first state and a second state depending on the estimated minimum required oil pressures.

An example method of operating the oil system 7 in FIG. 2 will now be described with reference to the schematic flow-chart in FIG. 3.

In a first step S1 various engine parameters, such as the engine speed 'rpm', the engine load 'load', and the oil temperature '$T_{oil}$' are acquired by the control unit 5.

In the subsequent step S2, the minimum required first gallery oil pressure $P_{MG}$ in the first gallery 13 (the main gallery 13 in FIG. 2) for supplying oil to the first engine site 14 (such as the crank shaft bearings 14 in FIG. 2), and the minimum required second gallery oil pressure $P_{PCJ}$ in the second gallery 15 (the PCJ gallery 15 in FIG. 2) for supplying oil to the second engine site (the bottom of the pistons in FIG. 2) are estimated based on the acquired engine parameters. Estimating such minimum required gallery oil pressures will, per se, be straight-forward to one of ordinary skill in oil systems for ICEs.

Based on a relation between the thus estimated minimum required first gallery oil pressure $P_{MG}$ and minimum required second gallery oil pressure $P_{PCJ}$, it is determined how the oil system 7 should be controlled. There are various possible relations that may be evaluated as a basis for determining the control strategy for the oil system 7. According to an example approach, the ratio between $P_{MG}$ and $P_{PCJ}$ can be determined (or the ratio between $P_{PCJ}$ and $P_{MG}$), and this ratio may be compared with one or several relevant threshold ratio(s). Alternatively, the pressure in the main gallery 13 (or at the outlet 22 of the pump arrangement 11) corresponding to the minimum required second gallery oil pressure $P_{PCJ}$ may be estimated based on $P_{PCJ}$ and a known pressure drop across the second gallery valve 25, when in a predefined state (such as fully open). This estimated minimum required pressure may then be directly compared with $P_{MG}$.

When it is determined in step S3 (regardless of exactly which approach is selected to achieve this) that the minimum required first gallery oil pressure $P_{MG}$ in the first gallery 13 is insufficient to achieve the minimum required second gallery oil pressure $P_{PCJ}$ in the second gallery 15 (when the second gallery valve 25 is open), the method proceeds to steps S4 and S5.

In S4, the control unit 5 controls the second gallery valve 25 to open, and in step S5, the control unit 5 controls the controllable pump arrangement 11 (for example by controlling the bypass valve 23 in FIG. 2) to achieve the minimum required second gallery oil pressure $P_{PCJ}$ in the second gallery 15, using feedback control based on a signal acquired from the second pressure sensor 29. From S5, the method returns to S1.

When it is instead determined in step S3 that the minimum required first gallery oil pressure $P_{MG}$ in the first gallery 13 is sufficient to achieve the minimum required second gallery oil pressure $P_{PCJ}$ in the second gallery 15 (when the second gallery valve 25 is open), the method proceeds to steps S6 and S7.

In S6, the control unit 5 controls the controllable pump arrangement 11 (for example by controlling the bypass valve 23 in FIG. 2) to achieve the minimum required first gallery oil pressure $P_{MG}$ in the first gallery 13, using feedback control based on a signal acquired from the first pressure sensor 27, and in step S7, the control unit 5 controls the second gallery valve 25 to achieve the minimum required second gallery oil pressure Pp in the second gallery 15, using feedback control based on a signal acquired from the second pressure sensor 29. From S7, the method returns to S1.

Figure 3:
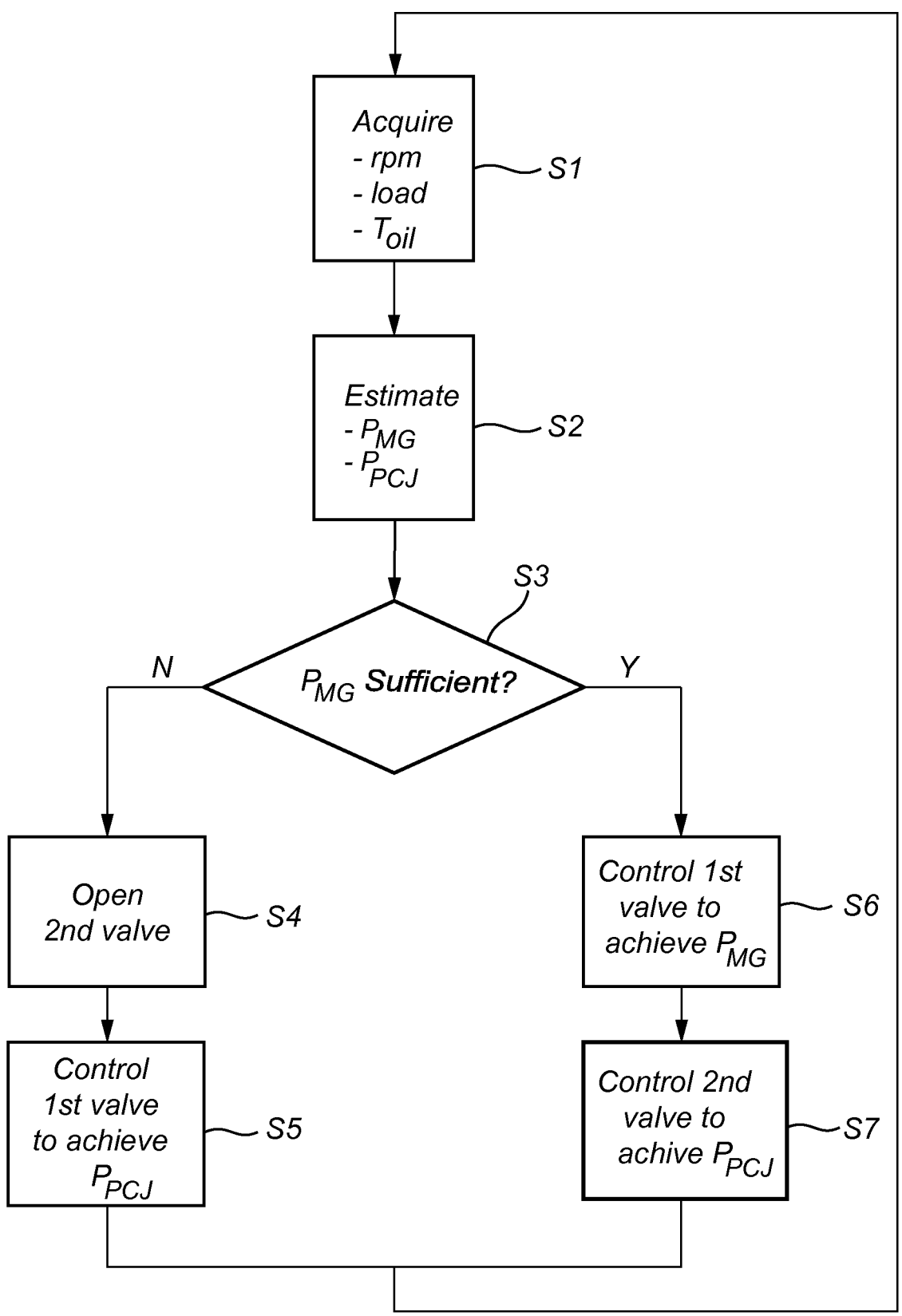
FIG. 3 is a flow-chart schematically illustrating a method according to an example embodiment of the present invention.

It should be noted that the method steps in FIG. 3 need not necessarily take place in the order indicated in FIG. 3. Further, some steps may be carried out in parallel. For instance, S4 and S5 may be carried out in parallel, and S6 and S7 may be carried out in parallel.

It is to be understood that the present invention is not limited to the embodiments described above and illustrated in the drawings; rather, the skilled person will recognize that many changes and modifications may be made within the scope of the appended claims.

The invention claimed is:

1. A method of controlling an oil system for an internal combustion engine, the oil system comprising:
   an oil reservoir;

a controllable pump arrangement fluid flow connected to said oil reservoir for pumping oil from said oil reservoir;

a first gallery fluid flow connected to said pump arrangement for receiving oil from said pump arrangement, said first gallery being configured to provide oil to a first engine site;

a second gallery fluid flow connected to said pump arrangement for receiving oil from said pump arrangement, said second gallery being configured to provide oil to a second engine site;

a second gallery flow control device for controlling flow of oil from said pump arrangement to said second gallery;

a first pressure sensor for sensing an oil pressure in said first gallery; and a second pressure sensor for sensing an oil pressure in said second gallery, said method comprising the steps of:

estimating a minimum required first gallery oil pressure in said first gallery for sufficient oil supply to said first engine site;

estimating a minimum required second gallery oil pressure in said second gallery for sufficient oil supply to said second engine site;

when a ratio between said minimum required second gallery oil pressure and said minimum required first gallery oil pressure is greater than a predefined first threshold ratio:

controlling said second gallery flow control device to an open state;

acquiring a signal indicative of a present oil pressure in said second gallery from said second pressure sensor;

controlling said pump arrangement to achieve at least said minimum required second gallery oil pressure in said second gallery using feedback control based on said signal indicative of the present oil pressure in said second gallery; and when the ratio between said minimum required second gallery oil pressure and said minimum required first gallery oil pressure is smaller than a predefined second threshold ratio, smaller than or equal to said first threshold ratio:

acquiring a signal indicative of the present oil pressure in said first gallery from said first pressure sensor; and controlling said pump arrangement to achieve at least said minimum required first gallery oil pressure in said first gallery using feedback control based on said signal indicative of the present oil pressure in said first gallery;

acquiring said signal indicative of the present oil pressure in said second gallery from said second pressure sensor; and controlling said second gallery flow control device to achieve at least said minimum required second gallery oil pressure in said second gallery using feedback control based on said signal indicative of the present oil pressure in said second gallery.

2. The method according to claim 1, wherein said second threshold ratio is smaller than said first threshold ratio.

3. The method according to claim 1, wherein:

the feedback control of the controllable pump arrangement is configured to exhibit a first time constant;

the feedback control of the second gallery flow control device is configured to exhibit a second time constant; and said second time constant is less than said first time constant.

4. The method according to claim 1, wherein said minimum required first gallery oil pressure and said minimum required second gallery oil pressure are estimated based on at least one of an engine speed, an engine load, and an oil temperature.

5. The method according to claim 1, wherein said second gallery is a piston cooling jet gallery; and said second engine site comprises at least one piston of said engine.

6. An oil system for an internal combustion engine, comprising:

a controllable pump arrangement fluid flow connected to an oil reservoir for pumping oil from said oil reservoir;

a first gallery fluid flow connected to said pump arrangement for receiving oil from said pump arrangement, said first gallery being configured to provide oil to a first engine site;

a second gallery fluid flow connected to said pump arrangement for receiving oil from said pump arrangement, said second gallery being configured to provide oil to a second engine site;

a second gallery flow control device for controlling flow of oil from said pump arrangement to said second gallery;

control circuitry having at least one input for receiving at least one signal indicative of at least one of an engine speed, an engine load, and an oil temperature, a first output connected to the pump arrangement, and a second output connected to the second gallery flow control device;

a first pressure sensor for sensing the oil pressure in said first gallery; and a second pressure sensor for sensing the oil pressure in said second gallery, wherein said oil system is controllable between:

a first state in which said control circuitry controls said second gallery flow control device to an open state, acquires a signal indicative of a present oil pressure in said second gallery from said second pressure sensor, and controls an oil pressure in said second gallery by controlling the pump arrangement using feedback control based on said signal indicative of the present oil pressure in said second gallery; and a second state in which said control circuitry acquires a signal indicative of the present oil pressure in said first gallery from said first pressure sensor, controls an oil pressure in said first gallery by controlling the pump arrangement using feedback control based on said signal indicative of the present oil pressure in said first gallery, and controls the oil pressure in said second gallery by controlling the second gallery flow control device using feedback control based on said signal indicative of the present oil pressure in said second gallery.

7. The oil system according to claim 6, wherein said control circuitry is configured to:

estimate a minimum required first gallery oil pressure in said first gallery for sufficient oil supply to said first engine site;

estimate a minimum required second gallery oil pressure in said second gallery for sufficient oil supply to said second engine site;

control said oil system to transition from said second state to said first state when a ratio between said minimum required second gallery oil pressure and said minimum required first gallery oil pressure has increased to become greater than a predefined first threshold ratio; and control said oil system to transition from said first state to said second state when the ratio between said minimum required second gallery oil pressure and said minimum required first gallery oil pressure has decreased to become smaller than a predefined second threshold ratio.

8. The oil system according to claim 7, wherein said second threshold ratio is smaller than said first threshold ratio.

9. A control unit for controlling the oil system, the control unit being configured to perform the steps of the method according to claim 1.

10. A computer program configured to cause the oil system to carry out the method according to claim 1 when run on control circuitry comprised in the oil system.

11. A computer readable medium carrying a computer program comprising program code means for performing the steps of claim 1 when said program product is run on a computer.

12. An internal combustion engine arrangement comprising the oil system according to claim 6.

13. A vehicle comprising the internal combustion engine arrangement according to claim 12.

* * * * *